(12) United States Patent
Krasner

(10) Patent No.: US 12,386,078 B2
(45) Date of Patent: Aug. 12, 2025

(54) METHODS AND APPARATUSES FOR IMPROVED ACQUISITION OF MODERN GNSS SIGNALS

(71) Applicant: oneNav, Inc., Sunnyvale, CA (US)

(72) Inventor: Norman Krasner, Redwood City, CA (US)

(73) Assignee: oneNav, Inc., Sunnyvale, CA (US)

( * ) Notice: Subject to any disclaimer, the term of this patent is extended or adjusted under 35 U.S.C. 154(b) by 15 days.

(21) Appl. No.: 18/242,446

(22) Filed: Sep. 5, 2023

(65) Prior Publication Data

US 2024/0094410 A1 Mar. 21, 2024

Related U.S. Application Data

(60) Provisional application No. 63/377,813, filed on Sep. 30, 2022, provisional application No. 63/408,383, filed on Sep. 20, 2022.

(51) Int. Cl.
*G01S 19/43* (2010.01)
*G01S 19/30* (2010.01)
*G01S 19/37* (2010.01)

(52) U.S. Cl.
CPC .............. *G01S 19/30* (2013.01); *G01S 19/37* (2013.01)

(58) Field of Classification Search
CPC .............. H04L 25/03866; H04L 7/043; H04L 2209/08; H04L 1/0072; H04L 27/2675;
(Continued)

(56) References Cited

U.S. PATENT DOCUMENTS 10,816,673 B2 * 10/2020 Nayyar .................... G01S 19/30
2003/0219066 A1 * 11/2003 Abraham ................ G01S 1/045
375/150

(Continued)

OTHER PUBLICATIONS

PCT International Search Report and Written Opinion from related PCT Application No. PCT/US2023/032851, mailed on Dec. 19, 2023 (12 pages).

(Continued)

*Primary Examiner* — Eva Y Puente
(74) *Attorney, Agent, or Firm* — WOMBLE BOND DICKINSON (US) LLP

(57) ABSTRACT

Many modern Global navigational satellite systems (GNSS) utilize signaling that includes a primary pseudorandom number (PRN) code and a secondary low rate PRN code, the latter of which is modulo-2 added to the first. In some GNSS acquisition receivers in which precise a priori synchronization information is unavailable, the acquisition process performs a set of correlation operations that begin at a time that is not aligned with the epoch of the secondary PRN code. This epoch misalignment results in loss of system performance. This disclosure provides new methods for dealing with such epoch misalignments and minimizes system performance loss. In one embodiment, a method combines a first and a second correlation operation, each using a different correlation epoch, to reduce the effect of epoch misalignments. This disclosure also provides methods for advantageously processing a characteristic double frequency peak that may appear in the acquisition process as a result of the correlation misalignment with the epoch of the secondary code.

22 Claims, 8 Drawing Sheets

(58) Field of Classification Search
CPC . H04L 9/06; H04L 9/12; H04L 1/0057; H04L 1/1812; H04B 1/709; H04B 1/7075; H04B 2201/70715; H04B 1/7085; H04B 2201/70701; H04B 1/70755; H04B 2201/7073; H04W 64/00; H04W 4/025; H04W 40/04; H04W 40/30; H04W 72/23; H04W 8/24; H04W 8/26; H04W 84/20; H04W 4/023
USPC ........................................................ 375/150
See application file for complete search history.

(56) References Cited

U.S. PATENT DOCUMENTS

| | | |
|---|---|---|
| 2007/0008217 A1 | 1/2007 | Yang |
| 2008/0013604 A1 | 1/2008 | Chen |
| 2009/0103656 A1* | 4/2009 | Chen .................. H04L 27/2278 |
| | | 342/357.77 |
| 2009/0213006 A1 | 8/2009 | Nayyar et al. |
| 2010/0260239 A1 | 10/2010 | Nitta |
| 2014/0184442 A1 | 7/2014 | Large |
| 2021/0373179 A1 | 12/2021 | McBurney et al. |
| 2022/0137236 A1 | 5/2022 | Conflitti et al. |
| 2023/0050047 A1 | 2/2023 | Maaref et al. |

OTHER PUBLICATIONS

International Preliminary Report on Patentability for related PCT Application No. PCT/US2023/032851, mailed on Apr. 3, 2025, 10 pages.

* cited by examiner

METHODS AND APPARATUSES FOR IMPROVED ACQUISITION OF MODERN GNSS SIGNALS

This application claims the benefit of and priority to the following US provisional patent applications: U.S. provisional patent application No. 63/377,813 which was filed by Applicant oneNav, Inc. on Sep. 30, 2022, and U.S. provisional patent application No. 63/408,383 which was filed by Applicant oneNav, Inc. on Sep. 20, 2022, and both of these US provisional patent applications are hereby incorporated herein by reference.

BACKGROUND

This disclosure relates to the field of global navigation satellite systems (GNSS) and more specifically to the field of processing GNSS signals in GNSS receivers in order to determine the position of the GNSS receivers.

Global navigational satellite system (GNSS) signals in the L5 radiofrequency (RF) band employ secondary pseudorandom number (PRN) codes layered on top of primary pseudorandom number codes. That is, as binary sequences, the primary and secondary codes, as well as data sequences, are modulo-2 added with one another. The secondary codes are normally present both on the data and pilot tributaries, the rates are those of the primary frame rate (1 kHz), and the frame epochs are coincident with that of the primary code. In this disclosure, the word "epoch" is to be construed as the start of a frame (or start of a collection time) and not the duration (in time) of the frame. The secondary code length on the data tributary are equal to the data symbol period and on the pilot channel are typically longer (e.g. on Galileo E5 the secondary code length of the pilot channel is 100). In general, the secondary codes provide improved cross-correlation performance versus other contemporaneous GNSS signals and, in addition, the pilot channel secondary codes provide synchronization of the data symbols. FIG. 1 shows a diagram of the framing structure of the primary and secondary codes without data present. Also shown in FIG. 1 is a case where receiver correlation intervals are in a disadvantaged situation, as discussed below.

Direct L5 acquisition is an approach in which a GNSS receiver uses only GNSS signals in the L5 band to acquire such signals without using L1 GNSS signals to aid in the acquisition of the L5 GNSS signals. This type of acquisition is difficult because it does not rely upon the acquisition of GNSS signals in the L1 RF band. Nevertheless, there are numerous advantages to direct L5 acquisition. An issue with direct L5 acquisition is that there is no a priori knowledge of the primary PRN epoch boundary. As a consequence, in the correlation process (done directly with time domain hardware correlators or via Fourier transform convolution methods), the epochs of a locally generated PRN reference and that of the secondary code can be offset from one another anywhere in the interval [0,1] of the primary code frame. We refer to this offset as a "frame epoch mismatch" or for simplicity in the following an "epoch mismatch." If all code phases are examined, with no frequency error, the average signal portion of the peak correlation output voltage per frame be altered anywhere from a factor of 1, with no epoch error, to 0.5 with epoch error of 0.5 frames, and hence there is a loss in sensitivity between 0 and 6 dB. This is most easily understood for the case of epoch error 0.5 frames.

For this worst case, when there is a transition of the secondary code, the primary code correlator, when aligned with the received signal code phase, produces output values equal and opposite for each of the 0.5 msec periods of the primary code period. Hence the correlator produces 0 output from the signal portion of the input. When there is no secondary code transition, there is no effect upon the primary code correlator output. Normally the secondary code has a number of transitions per its frame length that is around half its code length. Hence on average for an epoch error of 0.5, the signal voltage is reduced by 0.5 or 6 dB.

More generally, if the epoch error is d, where d is in the range [0, 0.5] the loss in signal voltage would be reduced a factor of 1-d. An error in the range [0.5,1] produces the same loss as 1-d. If we consider an ensemble average, over a set of independent acquisition operations, then the average loss is 0.75 or 2.5 dB. Conventional L1/L5 hybrid GNSS receivers avoid this loss of receiver sensitivity by first acquiring GNSS signals in the L1 RF band and then, once L1 GNSS signals have been acquired, acquiring the L5 GNSS signals (with sufficiently accurate time keeping information from the L1 acquisition process, to enable removal of the effect of the secondary code).

SUMMARY OF THE DESCRIPTION

Many modern Global navigational satellite systems (GNSS) utilize signaling that includes a primary pseudorandom sequence and a secondary low rate pseudorandom sequence, the latter of which is modulo-2 added to the first. In some GNSS acquisition receivers in which precise a priori synchronization information is unavailable, the acquisition process performs a set of correlation operations that begin at a time that is not aligned with the epoch of the secondary sequence. For example, a cold start of such GNSS receivers will most likely have correlation operations that begin at a time that is not aligned with the epoch of the secondary code PRN sequence. This error results in loss of system performance. This disclosure provides new methods and systems for dealing with such epoch mismatches or misalignments and for minimizing system performance loss.

A method according to one embodiment can use the following set of operations in a GNSS receiver to acquire GNSS signals: receiving GNSS signals in the GNSS receiver; performing a first correlation operation using a primary pseudorandom number (PRN) sequence and the received GNSS signals, the first correlation operation using the primary PRN sequence starting at a first correlation epoch; storing results of the said first correlation operation in a memory; performing, either contemporaneously during the first operation or at a time after the first correlation operation, a second correlation operation using the primary PRN sequence and the received GNSS signals, the second correlation operation using the primary PRN sequence starting at a second correlation epoch, wherein the second correlation epoch differs from the first correlation epoch; combining the stored results of the first correlation operation with the results of the second correlation operation to produce a combined correlation results; and storing the combined correlation results into the memory. In one embodiment, the first correlation epoch and the second correlation epoch are the different starting points in time for the respective correlation operation, and the first correlation epoch and the second correlation epoch are defined relative to a secondary PRN sequence in the received GNSS signals. In these embodiments, an epoch is the start of a time period (instead of the duration of the time period), and a correlation epoch is a start of a correlation operation which occurs over a period of time that begins at the correlation epoch. In these embodiments, the second correlation epoch is shifted in time relative to a repeating periodicity of the first correlation epoch. In one embodiment, the method can further include the operation of: performing at least one additional correlation operation using the primary PRN sequence starting at said first correlation epoch and combining the stored results of said first correlation operation with the results of the at least one additional correlation operation prior to performing said second correlation operation. In one embodiment, the first correlation operation includes a magnitude operation or a magnitude squared operation. In one embodiment, the combining of the stored results of the first correlation operation with the results of the second correlation operation, to produce the combined correlation results, can include an addition operation in which the results of the first correlation operation are added to the results of the second correlation operation.

The above description is a preferred embodiment in which the second, or other, correlations are performed after the first correlation. This minimizes required hardware for implementation. However, an alternative embodiment can perform the correlation operations corresponding to different epochs simultaneously. This applies primarily to implementations utilizing correlators, as described later.

In one embodiment, the GNSS receiver directly acquires L5 GNSS signals without using L1 GNSS signals to aid in the acquisition of the L5 GNSS signals and wherein the GNSS receiver uses fast Fourier transforms (FFTs) to perform frequency domain correlation (FDC) to directly acquire L5 GNSS signals and acquires L5 secondary codes in L5 GNSS signals without using L1 signals to aid in the acquisition of the L5 secondary codes. In another embodiment, the GNSS receiver includes both an L1/L5 hybrid GNSS that receives and acquires both GNSS signals in the L1 band and GNSS signals in the L5 band (e.g., when L1 signals are available) and an L5 only GNSS receiver that uses FDC to acquire GNSS signals in the L5 band.

In one embodiment, a change from the first correlation epoch to the second correlation epoch is accompanied by an operation that maintains a consistency of a location of a correlation peak, relative to the received GNSS signals, in outputs from both the first correlation operation and the second correlation operation; this operation may be referred to as a consistency operation. Maintaining a consistency of the location allows for the addition of the correlations from the two different correlation epochs to keep the code phase measurements from the two correlation epochs consistent relative to the received GNSS signals. In one embodiment, the consistency operation can be a shifting of an initial state of a local primary PRN generator. The shift is selected, as explained further below, to match the difference in time between the first correlation epoch and the second correlation epoch. In another embodiment, the consistency operation can be a selection of a set of samples from a locally generated PRN code or sequence such that in the first correlation epoch a first set of samples (from the locally generated PRN code) is used and in the second correlation epoch a second set of samples (from the locally generated PRN code) is used, and the first set of samples differs from the second set of samples. The difference between the samples is selected, as explained further below, to match the difference in time between the first correlation epoch and the second correlation epoch. In yet another embodiment, the consistency operation can be a change in the indices to memory locations in the correlation accumulation memory (e.g., change in the addresses to the correlation accumulation memory which store the correlation output values for each code phase hypothesis during a series of both the first and second correlation operations); this change in the indices is done to maintain the consistency of location of the correlation peaks in the outputs from both the first correlation operation and the second correlation operation.

A GNSS receiver can perform any one of the methods described herein. The GNSS receiver according to one embodiment can include: an antenna to receive GNSS signals from GNSS satellites; a radio frequency (RF) front end coupled to the antenna to amplify the GNSS signals; an analog to digital converter (ADC) coupled to the RF front end to generate a digital representation of received GNSS signals; a baseband memory coupled to the ADC to store the digital representation; and a GNSS processing system coupled to the baseband memory to process the received GNSS signals, the GNSS processing system configured to perform a first correlation operation using a primary PRN code and the received GNSS signals, the first correlation operation starting at a first correlation epoch and the GNSS processing system is configured to store results from the first correlation operation in a memory; and the GNSS processing system is configured to perform a second correlation operation using the primary PRN code and the received GNSS signals, the second correlation operation starting at a second correlation epoch which is different than the first correlation epoch; and the GNSS processing system is configured to combine the stored results of said first correlation operation with the results of said second correlation operation to produce a combined correlation results; and the GNSS processing system stores the combined correlation results. In one embodiment, the GNSS receiver directly acquires L5 GNSS signals without using L1 GNSS signals to aid in the acquisition of the L5 GNSS signals and wherein the GNSS receiver uses fast Fourier transforms (FFTs) to perform frequency domain correlation (FDC) to directly acquire L5 GNSS signals and acquires L5 secondary codes in L5 GNSS signals without using L1 signals to aid in the acquisition of the L5 secondary codes. In another embodiment, the GNSS receiver includes both an L1/L5 hybrid GNSS that receives and acquires both GNSS signals in the L1 band and GNSS signals in the L5 band (e.g., when L1 signals are available) using time domain correlators and an L5 only GNSS receiver that uses FDC to acquire GNSS signals in the L5 band.

The aspects and embodiments described herein can include non-transitory machine readable media that can store executable computer program instructions that when executed cause one or more data processing systems (e.g., one or more GNSS processing systems or processing logic in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a GNSS processing system or GNSS processing logic. Further, the embodiments described herein can use one or more GNSS receiver architectures (or components, methods or portions of such architectures) described in U.S. patent application Ser. No. 17/068,659, filed Oct. 12, 2020, by Paul Conflitti, et. al., with oneNav, Inc. as the Applicant and this patent application is hereby incorporated herein by reference. See US published application US 2022/0137236 which is a published version of this patent application.

The above summary does not include an exhaustive list of all embodiments and aspects in this disclosure. All systems, media, and methods can be practiced from all suitable combinations of the various aspects and embodiments summarized above and also those disclosed in the detailed description below.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can be used to acquire GNSS signals which can present difficult problems resulting from epoch mismatches that reduce receiver sensitivity. One or more of these embodiments can be used in a GNSS receiver that directly acquires L5 GNS signals; such a GNSS receiver can be referred to as an L5 only GNSS receiver that performs L5 only acquisition and tracking of GNSS signals in the L5 band. For L5 only acquisition (e.g., a GNSS receiver that includes only processing logic to receive and process L5 GNSS signals from, for example, the US GPS L5 constellation and the European E5 constellation and the Chinese Beidou constellation and does not use L1 GNSS signals to acquire L5 GNSS signals), the correlation outputs per primary PRN code are envelope detected and the results summed and subsequently examined for a peak above a threshold. In the following we assume that the number of postdetection summations is relatively large, at least as large as the secondary code lengths. In the following discussion when we refer to averaging of data it always refers to averaging data that has been envelope detected. Alternatively, one could average data which has undergone a magnitude-squared operation.

Figure 1:
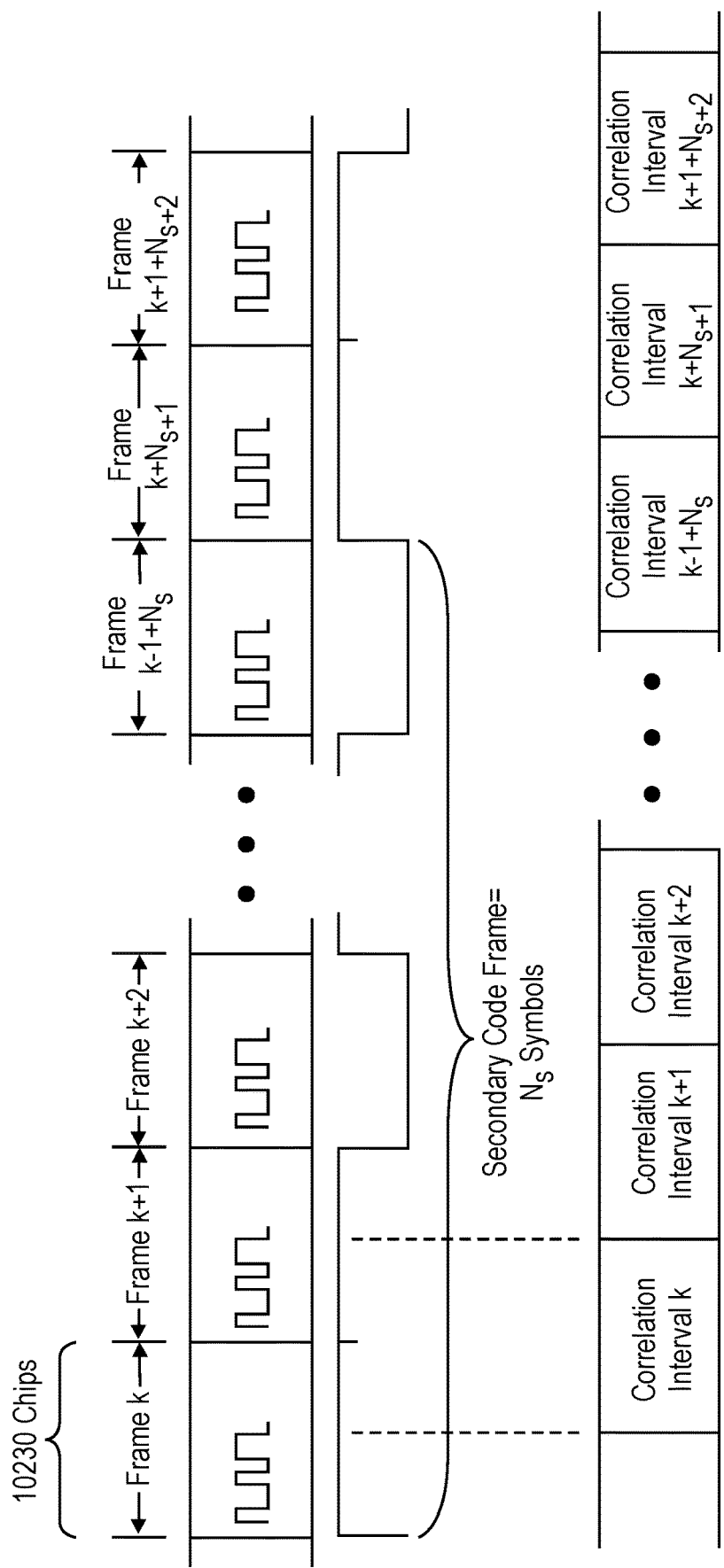
FIG. 1 shows a diagram of the framing structure of typical primary PRN code and secondary PRN code GNSS signals in the L5 RF band. It also shows a disadvantaged correlation interval relative to the epoch of the secondary PRN code.
Figure 2:
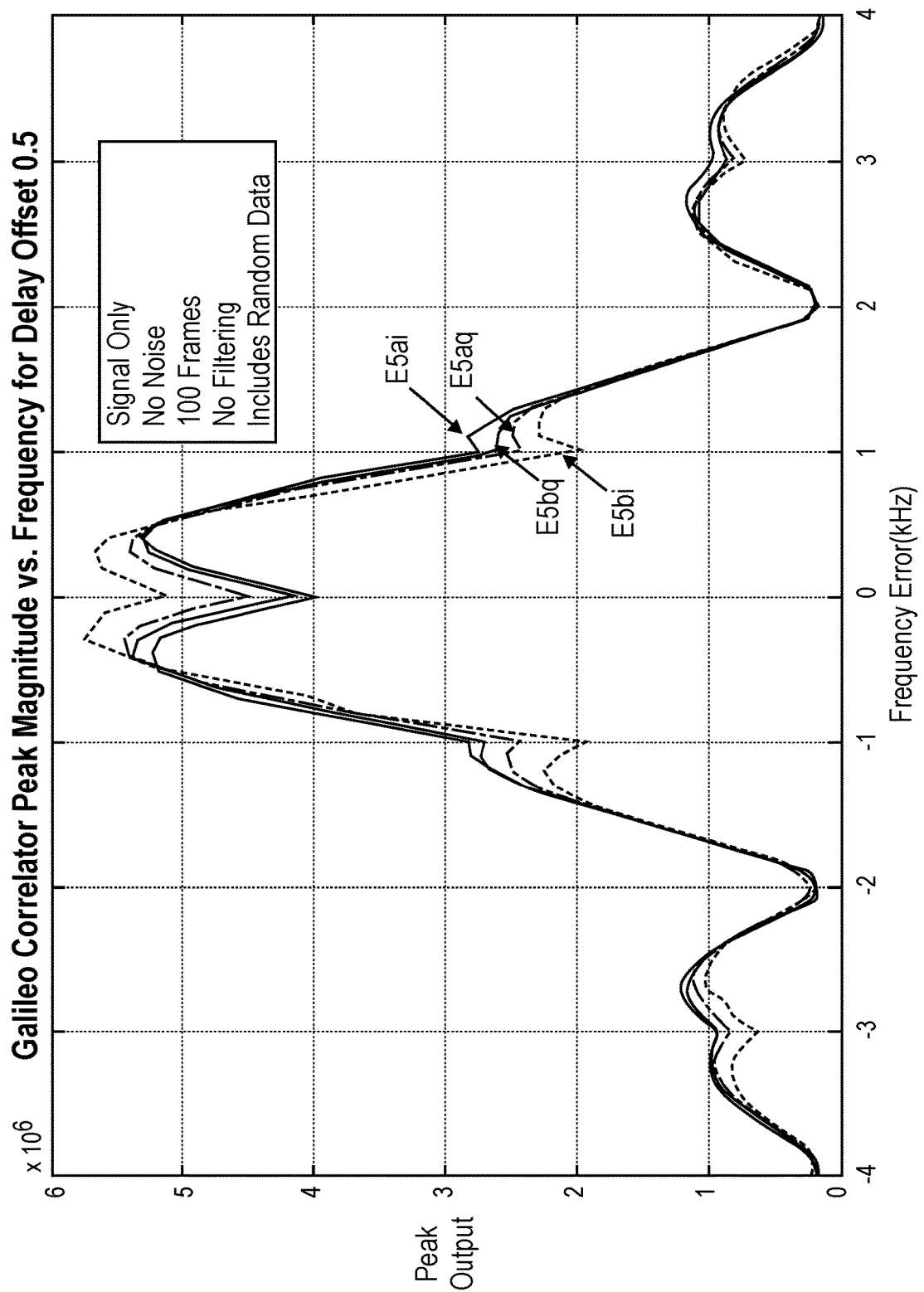
FIG. 2 is a correlation peak versus (vs) frequency graph of GNSS signals from a GNSS satellite (SV) in the Galileo constellation of GNSS SVs.
Figure 3:
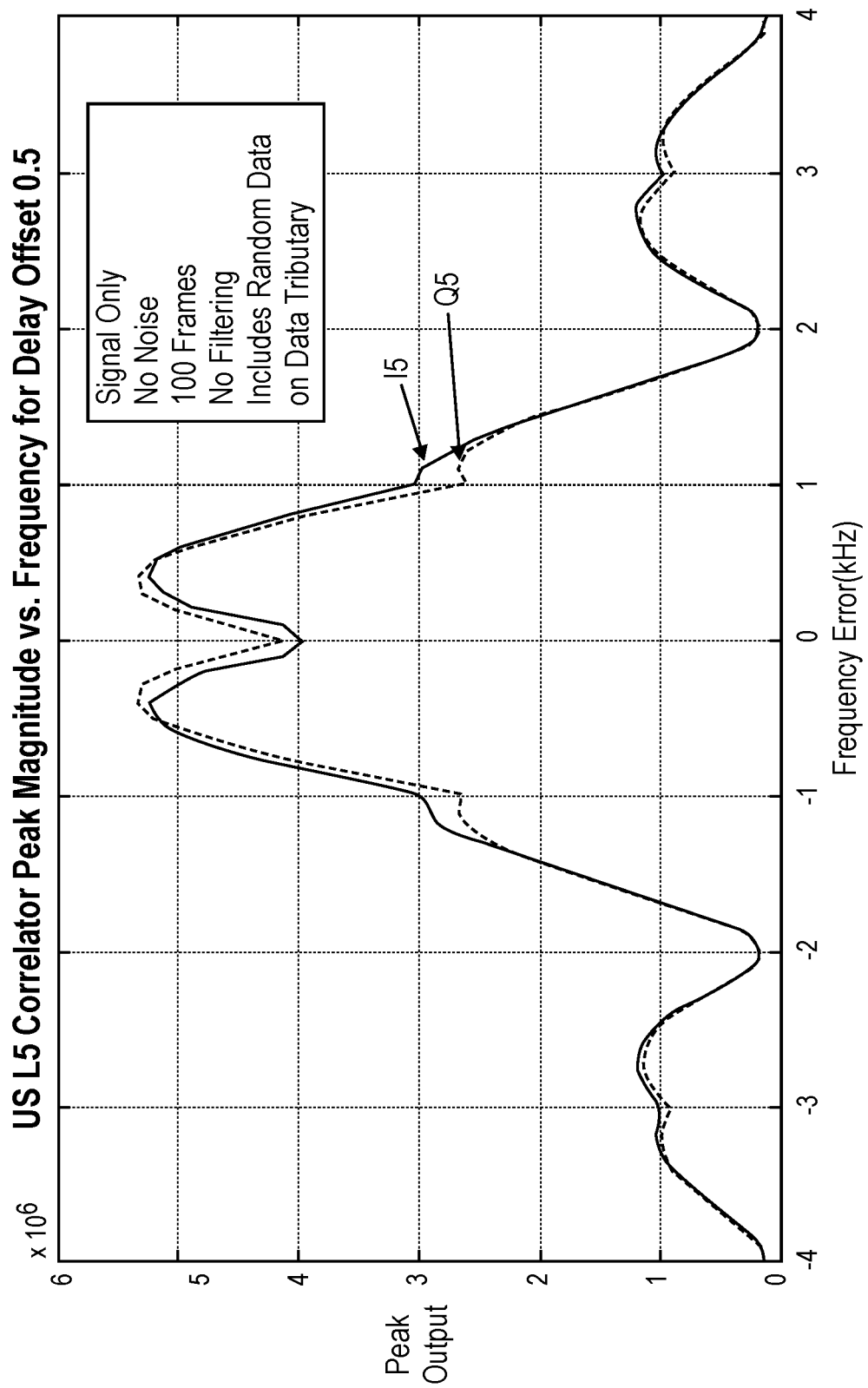
FIG. 3 is a correlation peak versus frequency graph of GNSS signals, in the L5 RF band, from a GNSS satellite (SV) in the US GPS constellation of GNSS SVs.
Figure 4:
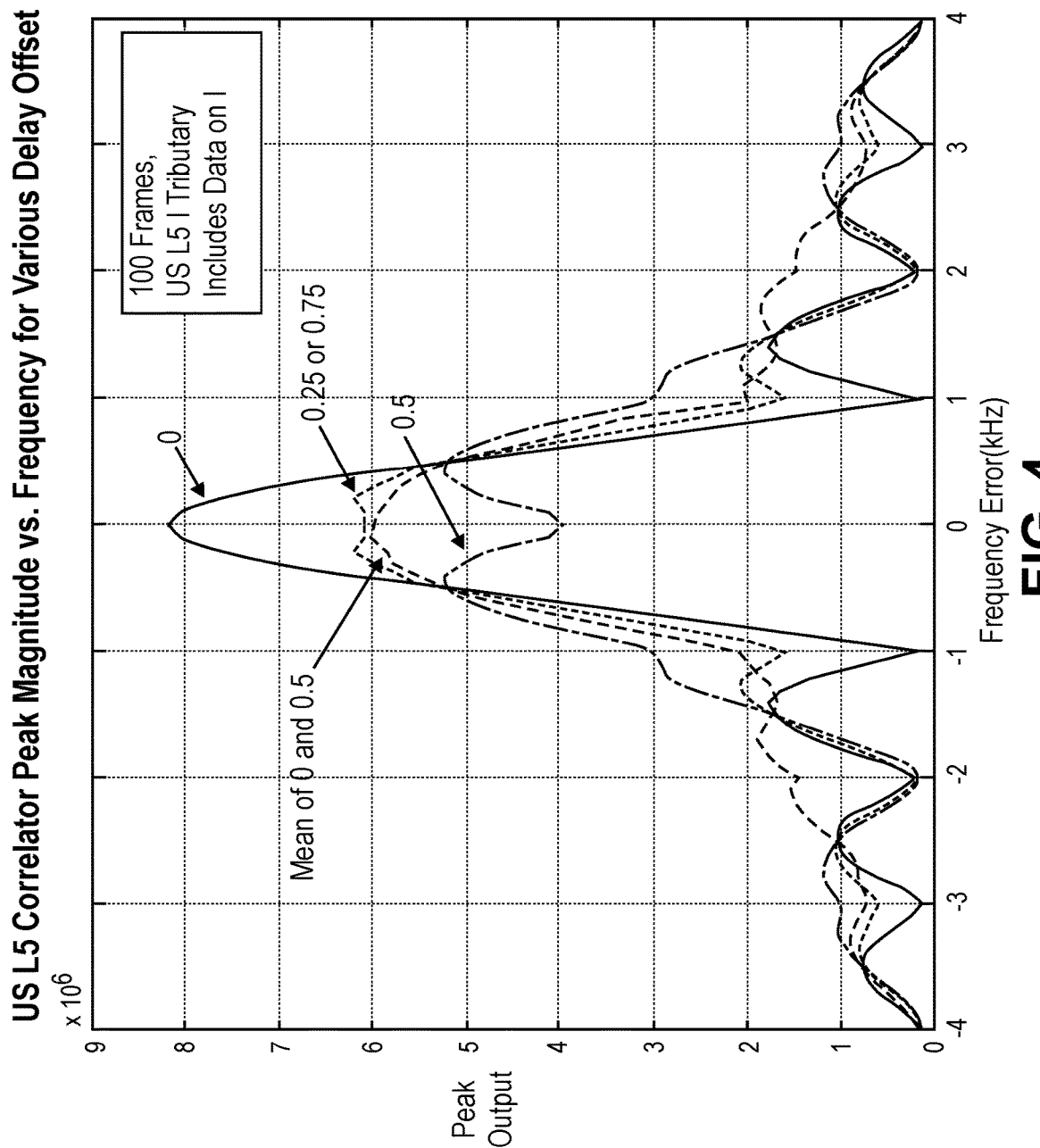
FIG. 4 is another correlation peak versus frequency graph of GNSS signals, in the L5 RF band, from a GNSS satellite (SV) in the US GPS constellation of GNSS SVs.

The analysis in the BACKGROUND section above is not the whole story, since it assumes that during the acquisition process the GNSS receiver has accurate frequency knowledge. In fact, during acquisition, a search is made over a range of frequencies associated with signal Doppler error plus local oscillator error. A typical search may utilize frequency steps of perhaps 250 Hz or 500 Hz. As seen below, this frequency step quantization introduces a host of issues, but does offer opportunity for sensitivity improvement if advantageously utilized. The presence of an epoch mismatch produces a curve of peak correlation output vs. hypothesized frequency that is not necessarily a single peak at the true carrier frequency, but may have a double hump characteristic with a local minima at the true carrier. The worst case situation is with an epoch mismatch of 0.5. As seen in FIGS. 2 and 3, this local minimum is around 2.5 dB below the level of the peaks on either side of it. These peaks are centered at approximately +/−400 Hz relative to the true carrier frequency. FIG. 4 shows examples of the correlation peak vs frequency for epoch errors of 0, 0.25 and 0.5 plus an average of the curves for 0 and 0.5 epoch mismatches. These curves are for the I channel of the US L5 signal containing data, and may "wiggle" a little due to presence of random data.

A heuristic explanation for the peaks is as follows. Suppose the hypothesized reference frequency relative to the true signal carrier was 500 Hz. Suppose also that at one frame the associated 500 Hz CW signal began at 0 phase. Then the cosine portion of the sinusoid would transition from 1 to −1 over the frame period, which would compensate for a similar transition of the incoming signal, assuming there was an epoch transition midpoint. The sine portion contributes no energy since its sign is unchanged over the frame period. Conversely, when there is no transition of the incoming signal, the sinusoidal portion of the sinusoid is all positive so it contributes energy, but the cosine portion, having a transition midframe produces no energy. The net effect is that there is a contribution to the correlation operation for every frame, and it turns out that this compensation for this case is around 0.64, which is ideally equal to the mean value of the sine function over [0, p]. This exceeds the output of 0.5 gotten on average with if the reference frequency was equal to the true signal frequency. The strongest gain in this manner is not at 500 Hz offset from the true carrier but at a little less, around 400 Hz.

The "worst case" epoch mismatch of 0.5 of the primary code frame represents a blessing and a curse. As indicated above, the loss at the true carrier frequency is 6 dB. However, the two peaks are actually around 2.5 dB above the value at the true carrier frequency, and hence the loss at these peaks is 3.5 dB rather than 6 dB. In addition, since there are two peaks of similar amplitude, and since the peak spacing of around 800 Hz renders their measurements independent, the probability of detection increases; this independence is important for the case when searching for GNSS signals is done in parallel, using a set of different carrier frequency hypotheses, operating on the same data set. The presence of double peaks may be advantageously used to increase the sensitivity of detection in several ways. For example, if the search procedure examines energy at frequencies near each peak, at a threshold setting of around 0.5, it is found that that the effective sensitivity increase is around 1 dB. Thus, the overall loss in sensitivity is around 2.5 dB for this worst case, rather than the 6 dB discussed previously. Another alternative is to employ a detection strategy that sums energy at two frequency locations where the frequency difference is in the range of around 800 to 1000 Hz. This would be done in addition to the normal search of one frequency at a time. The detection threshold would have to be altered for this alternative strategy to achieve a desired false alarm rate. In yet a third alternative, one could perform normal search in frequency but with a lower threshold than normal. If there is a tentative detection, a second check could be performed at a frequency displaced from that of the initial search by around 800 to 1200 Hz. If the second check is positive, then a detection would be declared.

The downside to the double peak situation is that often a detector may choose one of these double peaks as the true signal carrier frequency and hence create problems in the subsequent precision acquisition and tracking operations (such as tracking operations using a conventional delay lock loop to track code phase of a received GNSS signal).

A method of reducing the double peak problem for acquisition is found by observing in FIG. 3 the curve for the mean of 0 and 0.5 epoch error and the means of 0.25 and 0.75. In either case the resulting curves show either a single peak at the true carrier frequency or a curve that is nearly flat, still having a slight double peak but with the peaks now at around +/−200 Hz and only around 0.25 greater than the true peak. Hence with an epoch averaging procedure, in which different correlation epochs are used as part of the postdetection accumulation process, the peak width is narrower and fairly flat and amenable to some type of interpolation to improve initial carrier frequency estimate. The value at the true carrier frequency is close to 0.75 or −2.5 dB.

An embodiment could average calculations with more than two correlation epoch hypotheses, e.g., average four frames with four different correlation epochs spaced 0.25 frames or even eight different correlation epochs with 0.125 frame spacing between the eight correlation epochs. However, it appears that these alternative correlation epoch approaches do not provide a significant gain, and a downside is some increase in complexity. Practical issues on implementations of epoch averaging are discussed below.

Figure 5:
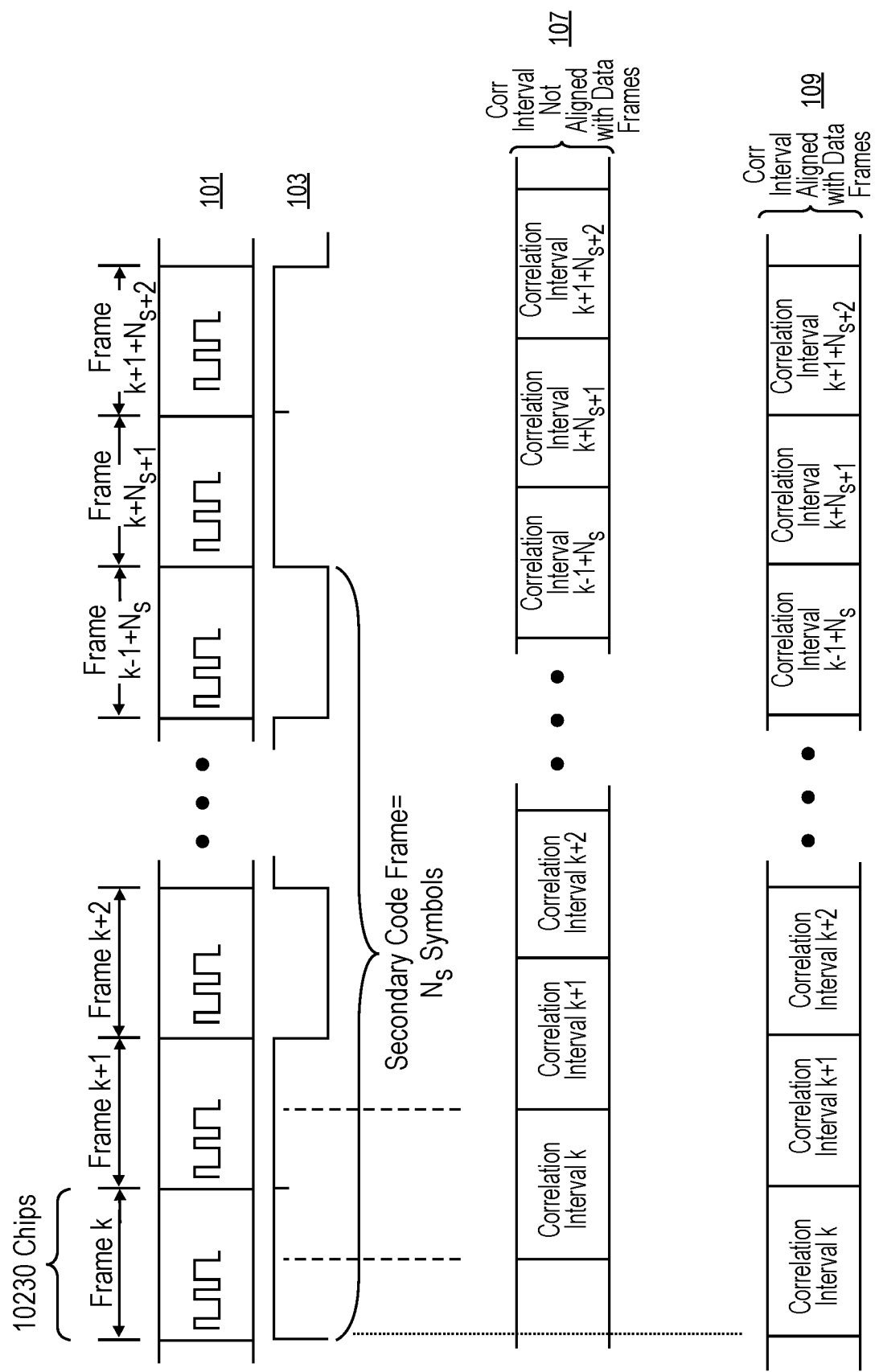
FIG. 5 shows a method for changing between correlation epochs according to one embodiment.

One method of doing the epoch adjustment for epoch averaging is to periodically, or otherwise, alter the time of collection or times of processing of a frame of GNSS data from digitized samples of received GNSS signals from GNSS satellites (GNSS SVs). This time of processing can be referred to as a correlation epoch that defines the beginning of the correlation interval (in which a correlation operation is performed). If standard time domain correlators are used to perform correlations in the GNSS receiver, the epoch of processing data can easily be altered by changing the start time (relative to the stream of the received GNSS signal) of the correlation epoch, and this is shown in FIG. 5. FIG. 5 shows at the top a situation in which the time of processing or correlation epoch begins at a disadvantageous time relative to the secondary code. Time in the stream of the received GNSS signal runs from left to right in FIG. 5. The primary PRN code sequence 101 in the stream is shown at the top of FIG. 5 and the secondary PRN code sequence 103 in the stream is shown immediately below the primary PRN code sequence 101. A time of processing using a first correlation epoch 107 (labelled as "Corr Interval not aligned with data frames") is shown immediately below the secondary PRN code sequence 103. This shows that the first correlation epoch 107 has a disadvantageous time relative to the secondary PRN code 103. In other words, as described above, the epoch mismatch between the first correlation epoch and the secondary PRN code will reduce the correlation peak output. In the sequence (labelled "Corr Interval aligned with data frames") at the bottom of FIG. 5, the time of processing for the second correlation epoch is shifted one-half frame relative to the first correlation epoch (to a second correlation epoch 109 that is a correlation epoch that is different than the first correlation epoch) and is now at an optimal position (relative to the epoch of the secondary PRN code). Each correlation operation in the different correlation epochs can use the same locally generated PRN code and can use correlation techniques that are known in the art such as hardware time domain correlators. However, the data samples within each correlation interval in the two different correlation epochs are different, and this can be seen in the first correlation interval in each of the two sets of correlations 107 and 109. In the initial correlation interval using the second correlation epoch (in the bottom "Corr interval aligned with data frames" at the far left), the data sample (used in that initial correlation interval) from the stream 101 begins at the beginning of the stream 101. In the initial correlation interval using the first correlation epoch ("Corr interval not aligned with data frames"), the data sample (used in that correlation interval) from the stream 101 begins one-half frame from the beginning of the stream 101. Both data samples have the same length (a full frame of 10230 chips in the case of a typical L5 primary PRN code). The GNSS receiver can alternate between using the different correlation epochs on a repeating basis over time so that the accumulated data (sum of the correlation results of multiple correlation operations over time) from the correlations at the different correlation epochs equally contribute to the accumulated data in order to detect a correlation peak. This in effect averages the results of the different correlation operations at the different correlation epochs. The alternating between the first correlation epoch to second correlation epoch can be repeated over time at known, predetermined intervals while receiving a GNSS signal. Averaging the results of these two different correlation intervals results in the improvement of FIG. 4. Similar analyses hold for different epoch offsets and different number of epochs. A method that avoids any loss of data would be to perform the correlation in increments of 0.5 msec (or in even finer increments), store the results and sum together the ones appropriate to the chosen epoch.

In advanced super parallel acquisition methods such as used by oneNav, Inc (see, for example, US published patent application number US 2022/0137236 which is incorporated herein by reference), the approach is a little more complex, since a frame of data is typically stored in a buffer memory from which a convolution engine processes essentially in parallel the results from multiple PRN code hypotheses and/or frequency hypotheses via very high speed time sharing of the computational elements. Data is output as a block containing in sequence all code phases. In a manner similar to that of the standard correlators above, one could increase the size of the buffer memory to provide additional amount of stored data and obviate the loss of processing time. For example, by increasing the buffer size by 50% one could select for processing that portion of memory appropriate to either of two different correlation epochs (or that with any other epoch with difference less than one-half frame). The downside to this approach is significant increase in memory, which probably would not be a good tradeoff vs. performance improvement, especially as other alternatives exist with little performance loss.

Alternative embodiments, not requiring additional memory, alter the data epoch by deleting a portion of data fed to the buffer memory so that the new correlation epoch of a frame of data is achieved. For the case of two correlation epochs to be averaged this means losing half a frame of data and is typically done infrequently. This is not very significant if the postdetection averaging time is many frames. For example, if the postdetection averaging time is 20 frames, then altering the epoch after 10 frames results in a loss of only half a frame per 20 or an SNR loss of 0.2 dB. In most cases more frames are averaged which results in smaller losses. In another example after every 5 frames one-fourth a frame of incoming data is deleted thus achieving epoch changes of increments of one-fourth frame. In this case there is a total loss of ¼ a frame of data, resulting in SNR loss over 20 msec of 0.3 dB and, of course much less for longer postdetection integration.

When altering the correlation epoch as described herein, the correlation peak relative to the new correlation epoch (e.g., second correlation epoch) occurs at a different time relative to that which occurred in the prior correlation epoch (e.g., first correlation epoch). In other words, the change between correlation epochs changes the location of the correlation peak. Delaying the collection time of GNSS data samples (from received GNSS signals) by one-half frame for a second correlation operation that uses a second correlation epoch, for example, means that relative to the original epoch (the first correlation epoch), the correlation peak for the second correlation operation will now exit at a time earlier by half a frame, modulo the frame period. This has some consequences from the standpoint of postdetection accumulation since in order to prevent the correlation peak from shifting, accumulated data has to be updated at new locations once an epoch has been altered. The location of the correlation peak within a GNSS primary PRN code frame specifies the best matching code phase hypothesis relative to the received GNSS signal that contains the GNSS primary PRN code. This change in the location of the correlation peak can be seen in FIG. 5; for example, the correlation peak for the correlation epoch 107 is at the middle of the primary PRN code frame 101 while the correlation peak for the correlation epoch 109 is at the beginning of the primary PRN code frame 101. However, it is desirable that the correlation peak occur at the same time relative to the epochs of all blocks so that the correlation peak data from the different correlation epochs may be added or accumulated together in memory. In other words, it is desirable to maintain consistency of the correlation peak location so that the accumulated outputs from the different correlation operations for the same code phase hypothesis (a particular code phase hypothesis) are stored in the same (single) memory location. Three approaches are described below to maintain this consistency.

One approach to maintain consistency of the correlation peak location alters the memory addresses or indices to memory locations for the correlation accumulation memory; in other words, new correlation output data for the second correlation operation (which starts at a second correlation epoch and which follows in time the first correlation operation) is added to memory locations offset from the prior locations by an amount equal to shift in the PRN primary code frame from the first correlation epoch to the second correlation epoch. For example, in the half frame epoch alteration shown in FIG. 5, the data sequence from the convolution engine needs to begin accumulation at a memory location halfway through the accumulation memory. Continuing with the example in FIG. 5, if the first correlation operation (which begins at the first correlation epoch) stores correlation outputs at memory locations 0 to 10229 (for correlations at 10230 possible code phase hypotheses over the 10230 chips in the frame), then the second correlation operation (which begins at the second correlation epoch and follows in time the first correlation operation) will store correlation outputs beginning with the 10230/2 location (half way through the memory) to store outputs for each of the 10230 code phase hypotheses and the storing process continues to the last memory location and wraps around from the last memory location (10229) to the first memory location (0) and finishes storing the last code phase hypothesis at the memory location immediately before the 10230/2 location. As an alternative approach to altering the accumulation start position in the correlation integration memory, the state of the PRN generator utilized in the correlation/convolution process can be altered in a manner such that the correlation peak comes out at the same time relative to either correlation epoch. The downside to this (for parallel convolutions performed from a common buffer) is that the appropriate PRN states for all PRN codes for all SV's and epochs (e.g., 0.25, 0.5, 0.75) need to be stored and retrieved when desired. Another alternative approach to this is run a PRN generator for a desired number of cycles or chips equivalent to the difference in the correlation epochs, prior to using the output from the generator to correlate against a new frame of received GNSS sample data. This approach (of running the PRN generator the desired number of cycles or chips) in fact would be simple to do since it can be done during the pause in the data collection time.

Presence of data on the data tributary does not alter the above discussion significantly since the data symbols transition with the secondary code and the secondary codes tend to look random over their lengths. The epoch mismatch loss issues discussed herein also pertain to L1 type processing if the coherent integration time equals the data symbol length. In this case the data by itself produces the same issues as the secondary code for the L5 cases—that is there typically will be data transitions in the midst of a correlation period. In the L1 case at the expense of some loss in sensitivity, one could instead use a coherent integration time of one-half data symbol length which would reduce the worst case loss due to epoch misalignment to around 2.5 dB rather than 6 dB. Also, in this latter case the double peak in frequency is either no longer present or minimal; the worst case situation corresponds to an error of 0.25 bits, performance similar to the curves of 0.25 or 0.75 shown in FIG. 4.

Figure 6:
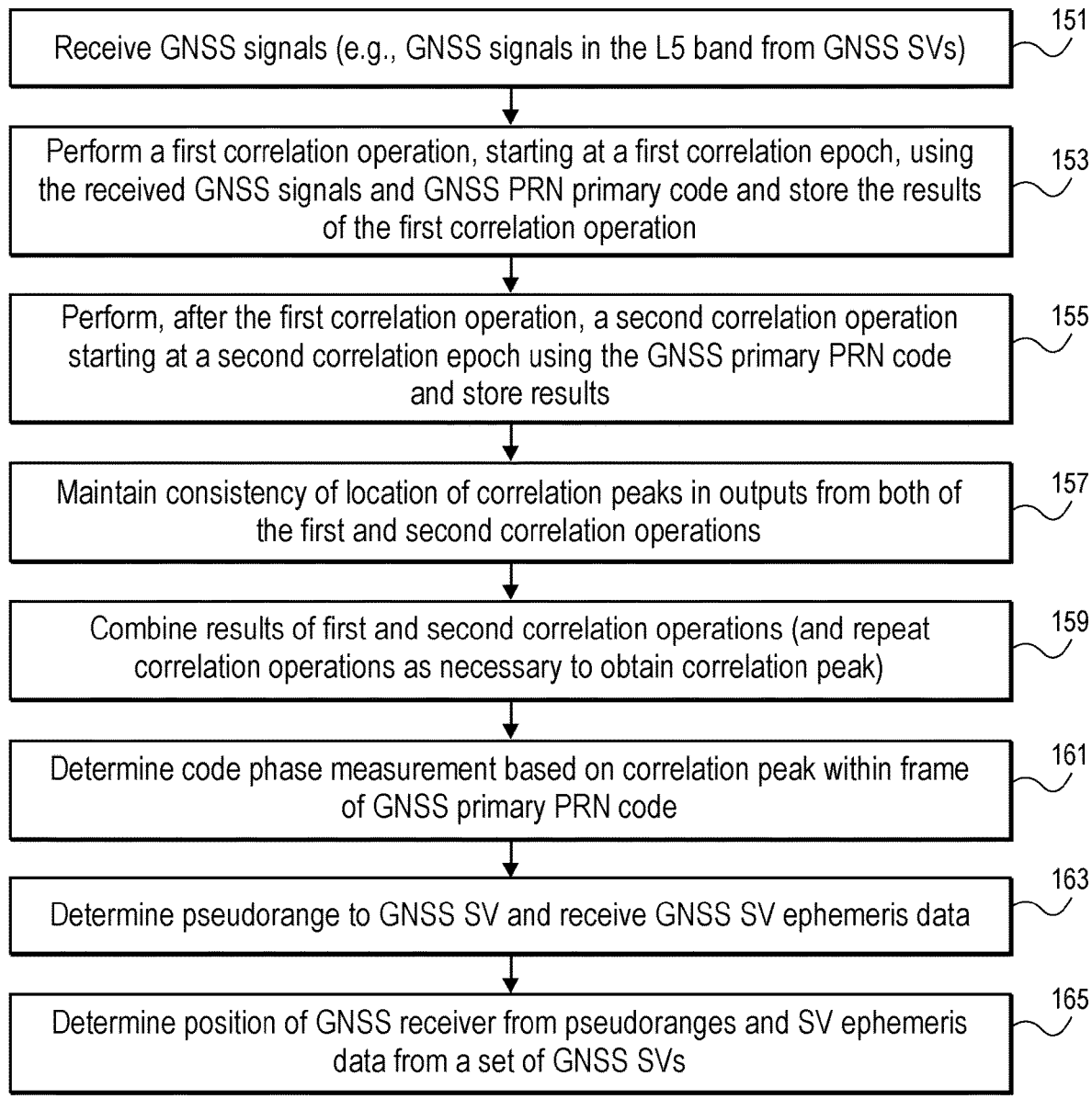
FIG. 6 is a flowchart that shows a method according to one embodiment.

FIG. 6 shows an example of a method in a GNSS receiver for averaging, or otherwise combining, different correlation operations that use different correlation epochs according to one embodiment. This example in FIG. 6 is based on the example shown in FIG. 5 which uses two different correlation epochs. It will be appreciated that an alternative method can use a different number of correlation epochs. In operation 151 in FIG. 6, a GNSS receiver receives GNSS signals, such as GNSS signals in the L5 band from GNSS SVs. These GNSS signals may include the L5 GPS signals from the US GPS constellation, the E5 GNSS signals from the European Galileo constellation, and the Chinese Beidou B2 L5 signals, and possibly other GNSS signals operating in the L5 RF band. The received GNSS signals can be digitized and stored in a buffer memory for processing as described herein. In operation 153, the GNSS receiver can perform a first correlation operation, which starts at a first correlation epoch, using the received GNSS signals and a set of one or more GNSS primary PRN codes; the first correlation operation in one embodiment stores the results of the correlation for each of the code phase hypotheses (at a particular frequency hypothesis) in a correlation integration memory which accumulates the results of the correlations over multiple correlation operations in time. Then in operation 155, the GNSS receiver performs, after the first correlation operation, a second correlation operation which starts at a second correlation epoch (which differs from the first correlation epoch relative to the received stream of GNSS signals). The second correlation operation computes correlation results for each of the code phase hypotheses. FIG. 5 shows an example of two different correlation operations which use two different correlation epochs 107 and 109 in the correlation operations on the received stream of GNSS signals 101; thus, FIG. 5 shows an example of operations 153 and 155 in FIG. 6. Operation 157 in one embodiment is performed to maintain consistency of location of correlation peaks in outputs from both of the first and second correlation operations. Three approaches to maintain consistency have been described as example of operation 157; operation 157 may be performed prior to operation 155 depending on the approach which is used. For example, if the approach used involves running the PRN code generator for a number of chips appropriate to the shift between the different correlation epochs prior to using the output from the PRN code generator in the correlation operation, then operation 157 will be performed before operation 155. Similarly, if the approach used involves changing the initial state of the PRN generator prior to using the output from the PRN generator in the correlation operation, then operation 157 will be performed before operation 155. On the other hand, if the approach used involves changing the memory indices used during the adding and storing operation, then operation 157 can be performed after operation 155. In operation 159, the GNSS receiver can combine the results of the first and second correlation operations by adding the results from the second correlation operation to the stored results from the first correlation operation; this will be understood to be an accumulation or integration operation in which the results of the different correlation operations are accumulated in the correlation integration memory. As is known in the art, this integration or accumulation can be performed repeatedly over many correlation operations (each of which processes 1 millisecond of received GNSS sample data in one embodiment); thus, the operations 153, 155, 157, and 159 can be repeated until a correlation peak has been obtained using noise threshold values to determine the emergence of a valid signal correlation peak. In operation 161, the GNSS receiver's GNSS processing system (e.g., a measurement engine in the GNSS processing system) can determine a code phase measurement based on the correlation peak within the frame of GNSS primary PRN code. As is known in the art, this code phase measurement can then be used, in operation 163, to determine a pseudorange to the GNSS SV that transmitted the GNSS primary PRN code, and in operation 163 the GNSS receiver can also receive GNSS SV ephemeris data for that GNSS SV using techniques known in the art. The GNSS receiver can perform the operations in FIG. 6 for many GNSS SVs to obtain multiple pseudoranges (e.g., four pseudoranges) to multiple GNSS SVs and then, in operation 165, the GNSS receiver (or an assistance server) can compute the position and velocity of the GNSS receiver from the pseudoranges and corresponding SV ephemeris data using techniques known in the art such as a weighted least squares algorithm. There are many possible alternatives to the sequence of the first and second correlation operations; while the method shown in FIG. 6 shows a sequence of first then second and then first and then second, etc., other embodiments may perform a series of N first correlation operations (each starting at the first correlation epoch) followed by N second correlation operations (each starting at the second correlation epoch). In general, as long as the number of frames of the primary PRN code exceed the length of the secondary PRN code and the number of first correlation operations and the number of second correlation operations are nearly the same, then the average of the results of the two different correlation operations will provide the benefits described herein. In many cases it may be advantageous to have the first and second correlation operations occur in an alternating sequence rather than have N operations of the first occur before N of the second, in order to avoid variations in the received signal's properties over time, such as signal amplitude and or time of arrival.

The description of FIG. 6 is a case in which the second, or other, correlations are performed after the first correlation. This minimizes required hardware for implementation. However, alternative embodiments can perform the correlation operations corresponding to different epochs simultaneously. This applies primarily to implementations utilizing correlators, as described later.

Any of the methods and operations described in this disclosure can be performed in a GNSS receiver that directly acquires L5 GNSS signals (e.g., both primary and secondary PRN codes) without using L1 GNSS signal acquisition to aid in the direct acquisition of primary and secondary PRN codes in L5 GNSS signals. For example, the methods and operations can be used in any one of the GNSS receivers described in one or both of the following US published patent applications filed by Applicant oneNav, Inc.: US 2022/0137236 and US 2021/0373179; both of these published applications are hereby incorporated herein by reference. The term L5 GNSS signals will be understood to mean the GNSS signals in the L5 radio frequency band, and these L5 GNSS signals include the L5 GPS signals from the US GPS constellation, the E5 GNSS signals from the European Galileo constellation, and the Chinese Beidou B2 L5 signals, and other GNSS signals operating in the L5 RF band (including GNSS like signals from low Earth orbit SVs). In another embodiment, any of the methods described herein can be performed in a hybrid GNSS receiver that acquires both L1 GNSS signals and L5 GNSS signals. In one embodiment of a hybrid GNSS receiver, the L5 GNSS signals are acquired after L1 GNSS signals have been acquired, in which case the acquisition of the L1 GNSS signals is used as an aide to acquire the L5 GNSS signals.

The embodiments (e.g., one or more GNSS receivers) described herein can receive and process GNSS signals from GNSS SVs that are part of one or more GNSS constellations deployed or developed by one or more governments (such as the United States GPS (Global Positioning System) system, the European Galileo system, the Chinese Beidou system, the Japanese QZSS system, the Russian GLONASS system and other such governmental systems, including regional systems, now or in the future), and the embodiments described herein can also be used with other satellite systems (e.g., low earth orbiting [LEO] satellites or other SVs which may not be deployed by or developed by a government and may be privately owned) or pseudolite systems (e.g., terrestrial systems including cellular telephone towers and other ground based transmitters) that transmit navigation signals that include ranging codes (e.g., PRN codes) and/or other data that can be used to determine a position in a receiver based upon the transmitted signals that are received by the GNSS receiver. Thus, the term GNSS SV (or GNSS satellite) is intended to include all such satellites systems and pseudolite systems, now or in the future, and the term GNSS receiver is intended to include a receiver that can receive and acquire and process transmitted signals from a subset of or all of such satellite systems and pseudolite systems to determine a position of the GNSS receiver. Moreover, the term GNSS signals is intended to include such transmitted signals from a subset of or all of such satellite systems and pseudolite systems. In other words, a GNSS SV is any transmitter/source of signals, such as GNSS signals, that can be received by and used in a GNSS receiver to determine the receiver's position (e.g., latitude and longitude) from the received GNSS signals. Hence, for example, the embodiments described herein can be used with navigation systems based on low earth orbiting SVs or other SVs or ground based transmitters that transmit navigation signals that can be used by a GNSS receiver to determine its position.

Figure 7A:
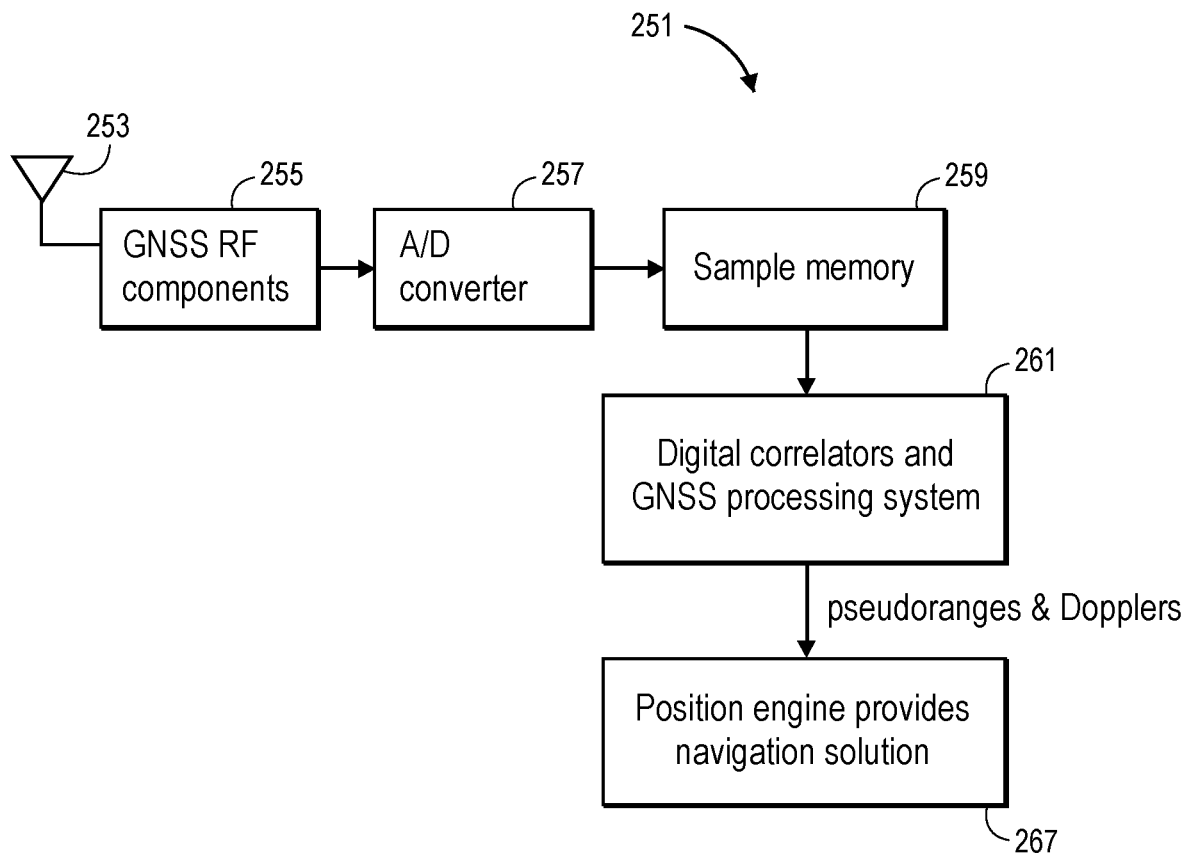
FIG. 7A is a block diagram that shows an example of an embodiment of a GNSS receiver.

FIG. 7A shows an example of a GNSS receiver 251 that can perform any one of the methods described herein, such as the method shown in FIGS. 5 and 6. The GNSS receiver 251 can receive GNSS signals from GNSS SVs through the one or more GNSS antennas 253; those received GNSS signals can be amplified, filtered and downconverted by GNSS RF components 255 which provides an analog output to an analog-to-digital (A/D) converter 257 which digitizes the received GNSS signals. The digitized GNSS signals are then stored in a sample memory 259 for processing by a set of digital correlators and GNSS processing system 261; in one embodiment, the architecture of GNSS receiver 251 up to and including the digital correlators can be similar to one or more of the architectures of the Fourier transform based convolution type GNSS receivers described in U.S. patent application Ser. No. 17/068,659, filed Oct. 12, 2020, by applicant oneNav, Inc. See US published application US 2022/0137236 which is a published version of this patent application. In one embodiment, the digital correlators can be conventional time domain correlators that do not use discrete Fourier transforms to acquire GNSS signals. The GNSS processing system 261 can include conventional tracking loops, such as a delay locking loop to track each measured code phase and a phase locking loop to track a carrier frequency. The GNSS processing system also includes processing logic to decode the navigation data contained in the GNSS signals (e.g., SV ephemeris data). In one embodiment, the position engine 267 can be computational processing logic that uses a position solution algorithm such as a weighted least squares algorithm to compute a position solution (e.g., a latitude and longitude and altitude of the GNSS receiver). The GNSS processing system 261 can also use one or more of the techniques described in U.S. patent application Ser. No. 17/334,477, which was filed on May 28, 2021, by applicant oneNav Inc. and published as US published application 2021/0373179, and this patent application is hereby incorporated herein by reference. For example, the GNSS processing system 261 can use these techniques to acquire secondary code phases of the secondary codes used in certain GNSS systems such as the Galileo system of GNSS SVs in the Galileo constellation.

Figure 7B:
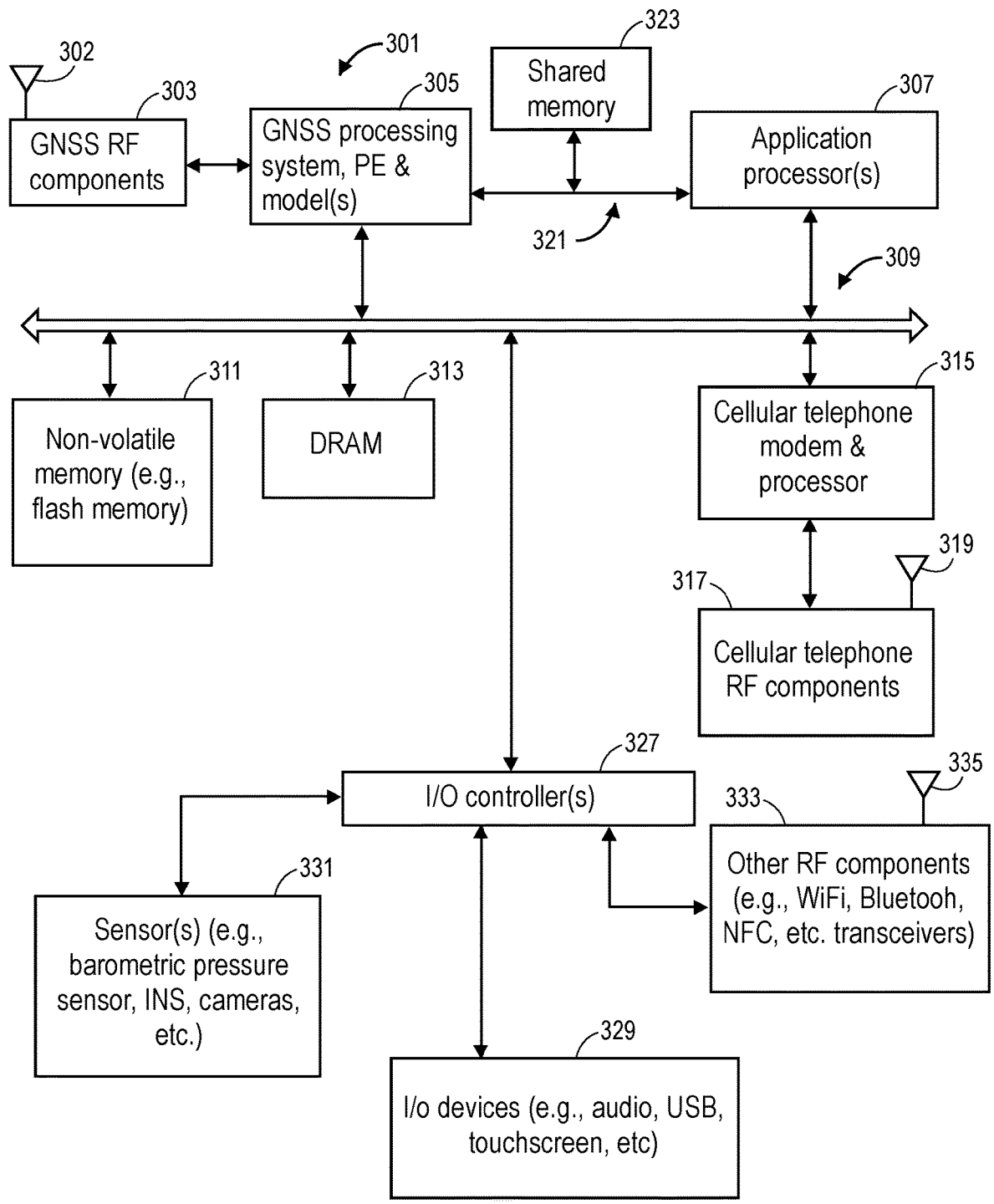
FIG. 7B is a block diagram that shows an example of a system containing a GNSS receiver according to one embodiment.

The one or more embodiments described herein can be used in a system with other components that are coupled to a GNSS receiver that includes the one or more embodiments. Examples of such systems include, for example, smartphones, smart watches, wearables (e.g., headmounted displays or fitness wearables), internet of things (IoT) devices, vehicles (e.g., an automobile), and other devices that can include a GNSS receiver to provide position information, etc. FIG. 7B shows an example of such a system which may be a smartphone or a smartwatch or other devices. The system 301 in FIG. 7B includes GNSS RF components 303 and a GNSS antenna 302 coupled to the GNSS RF components 303; the GNSS RF components 303 can include one or more low noise amplifier(s) and one or more bandpass filters and one or more downconverters and one or more analog to digital (ADC) converters. In some embodiments, the system 301 can include an additional GNSS antenna (e.g., if the system includes a hybrid L1/L5 GNSS receiver that receives and processes GNSS signals from both of the L1 and L5 radio frequency bands). These GNSS RF components 303 can receive GNSS signals from GNSS SVs, through GNSS antenna(s) 302, and amplify and create digital representations of the received GNSS signals and store them in one or more data sample memories that are accessed by the GNSS processing system 305. The GNSS processing system 305 can include all of the hardware and software used to acquire and track GNSS signals using, for example, digital correlators and tracking loops; the GNSS processing system may also include memory to store the data samples of the received GNSS signals and hardware/software to compute a position solution. The digital correlators may be hardware correlators (e.g., see for example, US 2009/0213006) or fast Fourier transform based processing logic that uses discrete Fourier transforms (DFT) to correlate the received GNSS signals with locally generated PRN codes. Published US application number 2022/0137236 describes examples of the use of DFT processing to correlate received GNSS signals. The GNSS processing system 305 also includes processing logic that implements a measurement engine that processes the correlation results to compute pseudorange measurements and range rate measurements, and the GNSS processing system can also include a position engine that computes positions (e.g., latitude and longitude data) using known methods, such as a weighted least squares algorithm or other known methods, to compute the position of the GNSS receiver from pseudorange measurements and SV ephemeris data. The GNSS processing system 305 also extracts the ephemeris data (e.g., satellite navigation data) from the received GNSS signals. In one embodiment, the system 301 may receive the SV ephemeris data from one or more sources other than the SVs (e.g., from an assistance server). In one embodiment, the GNSS processing system 305 can include one or more trained models (e.g., trained neural networks) that provide data used by one or both of the measurement engine or the position engine. For example, the GNSS processing system 305 can include a trained model to provide a selection of SVs as described in this U.S. patent application Ser. No. 18/118,677 filed on Mar. 7, 2023, by applicant oneNav, Inc and entitled Methods and Systems for Enhanced RANSAC Selection of GNSS Signals. The GNSS processing system 305 may also include a trained model that provides excess path length (EPL) corrections to correct pseudorange measurements to mitigate multipath effects; U.S. patent application Ser. No. 17/836,116, filed on Jun. 9, 2022, by applicant oneNav Inc., provides examples of such a trained model that provides EPL corrections. The GNSS processing system 305 may also include a trained model that classifies GNSS signals as either line-of-sight signals or non-line-of-sight signals. The GNSS processing system 305 can provide computed positions (e.g., latitude and longitude and altitude data) of the GNSS receiver to other components of system 301, such as the one or more application processors 307.

The GNSS processing system 305 is coupled to the other components of system 301 through one or more buses, such as the bus 309. In one embodiment, the system 301 can include multiple buses that are coupled to each other through one or more bus interfaces as is known in the art. In one embodiment, the GNSS processing system 305 may be coupled to the one or more application processors 307 through a local bus 321 that is coupled to a shared memory 323 which can be shared between the GNSS processing system 305 and the one or more application processors 307. Published US application US 2022/0137236 provides an example of such a shared memory. In one embodiment, the GNSS processing system 305, the shared memory 323, and the one or more application processors 307 can be instantiated in a single integrated circuit which can be referred to as a system on a chip (SOC). The shared memory 323 can be used by the GNSS processing system 305 to store locally generated PRN codes for the correlation operations (if such codes are stored rather than being dynamically generated) and to store accumulation results of the correlation operations (such as accumulation results for hypothesized code phase and Doppler shift hypotheses). The one or more application processors 307 can be the main processors on system 301 that execute user programs and system programs (such as telephony applications and other communication applications, web browsers, messaging applications, maps and navigation applications, productivity applications, social media applications, etc.) on the system 301. The GNSS processing system 305 and the one or more application processors 307 can operate together to provide navigation services to the user of the system 301; furthermore, the one or more application processors or the GNSS processing system 305 can utilize other components in system 301 (such as one or more sensors 331, the cellular telephone modem 315, and/or the other RF components 333) to provide assistance data that can be combined with or fused with position data from the GNSS processing system.

The system 301 includes non-volatile memory 311 which may be any form of non-volatile memory, such as flash memory; the non-volatile memory can store system software (e.g., operating system software), system data and user applications and user data. The non-volatile memory 311 is coupled to the rest of the system 301 by bus 309. The system 301 includes DRAM 313 (dynamic random access memory) which can be considered the main memory of the system 301; it stores loaded and running user and system applications and stores system and user data as is known in the art. The DRAM 313 is coupled to the rest of the system 301 by bus 309. The system 301 also includes a cellular telephone implemented by cellular telephone modem and processor 315 and cellular telephone RF components 317 and antenna 319. The cellular telephone can be used to request and receive GNSS assistance data (e.g., satellite almanac data, SV ephemeris data, Doppler estimates based on an approximate location of the GNSS receiver, correction data such as ionospheric corrections, etc.) from one or more assistance servers. The cellular telephone may also be used by the user for communication, including phone calls, text messaging, social media applications, internet applications, etc.

The system 301 also includes one or more conventional input/output (I/O) controllers 327 that couple zero or more input devices and zero or more output devices to the rest of the system 301. The I/O controllers 327 can be conventional I/O controllers used to interface an input or output device to the rest of the system 301. Some of the input devices may be sensors 331 that can provide assistance data that is used when computing or determining a position. This assistance data can be combined with or fused with a position solution from a GNSS position engine. For example, the sensors 331 may include a barometric pressure sensor that can be used to provide an estimate of the altitude of the system 301 as is known in the art. This altitude can be used by the position engine when computing a weighed least squares solution (e.g., the altitude from the barometric pressure sensor can provide the initial estimated altitude value in the weighted least squares algorithm). This altitude from the barometric pressure sensor may also be used to provide a measure of the reliability of the altitude computed from each subset of 4 SVs; for example, the altitude from the barometric sensor may be compared to the altitude from each subset (e.g., compute the difference between the two computed altitude values), and if the difference (for a particular subset) exceeds a threshold value, the altitude from the particular subset is deemed not reliable or not meaningful while if the difference is less than or equal to the threshold value then the altitude computed from the particular subset is considered reliable or meaningful. In one embodiment, the barometric pressure sensor may be calibrated or corrected by data from an assistance service which can account for current weather and environmental conditions (using techniques known in the art) in the vicinity of the system 301 to provide a more accurate altitude. The sensors 331 may also include an inertial navigation system (INS) or dead reckoning system that can, once initialized with a correct position, provide position data about the location of the system 301 as it moves; the INS can include accelerometers and gyro devices that measure movement of the system 301 over time. Data from the INS can be combined with or fused with a position solution from a GNSS position engine using techniques known in the art. The I/O devices can also include conventional input/output devices such as audio devices (e.g., speakers and microphone), a USB interface, and a touch-screen that receives touch inputs and displays images, etc. The I/O output devices may also include other RF systems 333 with one or more antennas 335; these other RF systems may include one or more of conventional WiFi (or other wireless local area networks), Bluetooth or NFC (near field communication) RF transceivers. These other RF systems may also be used in some embodiments to deliver assistance data to the GNSS processing system or the application processors to determine a position of the system 301. For example, the WiFi transceiver may deliver assistance data (e.g., SV almanac data, etc.) to the GNSS processing system 305 and may also supply an approximate location to the GNSS processing system 305 and/or the one or more application processors (e.g., using the name (e.g., SSID) of the WiFi access point to look up the approximate location of the WiFi access point from one or more databases that are known in the art).

What is claimed is:

1. In a GNSS receiver which receives a GNSS signal containing a primary pseudorandom number (PRN) code with frame length D and a secondary PRN code whose symbol durations are D or a multiple thereof, and wherein D is an integer and at least equal to one, a method of acquiring GNSS signals received by the GNSS receiver, the method comprising:
  performing a first correlation operation using the primary PRN code, the first correlation operation using the primary PRN code starting at a first correlation epoch;
  storing results of the first correlation operation in a memory;
  performing either contemporaneously, or at a later time, a second correlation operation using the primary PRN code, the second correlation operation starting at a second correlation epoch, wherein the second correlation epoch differs from the first correlation epoch;
  combining the stored results of the first correlation operation with the results of the second correlation operation to produce a combined correlation result;
  storing the combined correlation result into the memory;
  determining one or more pseudoranges in the GNSS receiver from the combined correlation result; and
  determining a position of the GNSS receiver from the determined one or more pseudoranges.

2. The method as in claim 1, wherein at least one additional correlation operation is performed using the primary PRN code, the at least one additional correlation operation starting at the first correlation epoch and combining the stored results of said first correlation operation with the results of the at least one additional correlation operation prior to performing said second correlation operation.

3. The method of claim 1, wherein said first correlation operation includes a magnitude operation.

4. The method of claim 1, wherein the first correlation operation includes a magnitude-squared operation.

5. The method of claim 1, wherein the combining is an addition of the results of the first correlation operation and the second correlation operation in the memory which is an accumulation memory that is used to find a correlation peak.

6. The method of claim 1, wherein the GNSS receiver directly acquires L5 GNSS signals without using L1 GNSS signals to aid in the acquisition of the L5 GNSS signals and wherein the GNSS receiver uses fast Fourier transforms (FFTs) to perform frequency domain correlation to directly acquire L5 GNSS signals and acquires L5 secondary codes in L5 GNSS signals without using L1 signals to aid in the acquisition of the L5 secondary codes.

7. The method of claim 1, wherein the second correlation epoch is shifted in time relative to a repeating periodicity of the first correlation epoch.

8. The method of claim 1, wherein a change from the first correlation epoch to the second correlation epoch is accompanied by shifting an initial state of a local primary pseudorandom number (PRN) code generator.

9. The method of claim 1, wherein a change from the first correlation epoch to the second correlation epoch is accompanied by selecting a set of samples from a locally generated PRN code that differs in the second correlation operation from that of the first correlation operation.

10. The method of claim 5, wherein a change from the first correlation epoch to the second correlation epoch is accompanied by a change in indices to memory locations in the accumulation memory in order to maintain a consistency of location of a correlation peak in outputs from both the first correlation operation and the second correlation operation.

11. The method of claim 1, wherein a change from the first correlation epoch to the second correlation epoch is accompanied by an operation that maintains a consistency of location of a correlation peak in outputs from both the first correlation operation and the second correlation operation.

12. A GNSS receiver comprising:
  an antenna to receive GNSS signals from GNSS satellites;
  a radio frequency (RF) front end coupled to the antenna to amplify the GNSS signals;
  an analog to digital converter (ADC) coupled to the RF front end to generate a digital representation of received GNSS signals;
  a baseband memory coupled to the ADC to store the digital representation; and
  a GNSS processing system coupled to the baseband memory to process the received GNSS signals, the GNSS processing system configured to perform a first correlation operation using a primary PRN code, the first correlation operation starting at a first correlation epoch and the GNSS processing system is configured to store results from the first correlation operation in an accumulation memory; and the GNSS processing system is configured to perform a second correlation operation using the primary PRN code, the second correlation operation starting at a second correlation epoch which is different than the first correlation epoch; and the GNSS processing system is configured to combine the stored results of said first correlation operation with the results of said second correlation operation to produce a combined correlation results; and the GNSS processing system stores the combined correlation results in the accumulation memory and wherein the GNSS processing system determines one or more pseudoranges from the combined correlation results and the GNSS processing system determines a position of the GNSS receiver from the one or more pseudoranges.

13. The GNSS receiver as in claim 12, wherein the GNSS receiver directly acquires L5 GNSS signals without using L1 GNSS signals to aid in the acquisition of the L5 GNSS signals and wherein the GNSS receiver uses fast Fourier transforms (FFTs) to perform frequency domain correlation to directly acquire L5 GNSS signals and acquires L5 secondary codes in L5 GNSS signals without using L1 signals to aid in the acquisition of the L5 secondary codes.

14. The GNSS receiver as in claim 12, wherein the baseband memory stores a two dimensional array of GNSS data samples in the memory for correlations against single primary PRN code frames of received GNSS signals.

15. The GNSS receiver as in claim 12, wherein a change from the first correlation epoch to the second correlation epoch is accompanied by shifting an initial state of a local primary pseudorandom number (PRN) code generator.

16. The GNSS receiver as in claim 12, wherein a change from the first correlation epoch to the second correlation epoch is accompanied by selecting a set of samples from a locally generated PRN code that differs in the second correlation operation from that of the first correlation operation.

17. The GNSS receiver as in claim 12, wherein a change from the first correlation epoch to the second correlation epoch is accompanied by a change in indices to memory locations in the accumulation memory in order to maintain a consistency of location of a correlation peak in outputs from both the first correlation operation and the second correlation operation.

18. The GNSS receiver as in claim 12, wherein a change from the first correlation epoch to the second correlation epoch is accompanied by an operation that maintains a consistency of location of a correlation peak in outputs from both the first correlation operation and the second correlation operation.

19. The GNSS receiver as in claim 12, wherein the first correlation operation includes one of a magnitude-squared operation and a magnitude operation.

20. The GNSS receiver as in claim 12, wherein the GNSS receiver includes an L1/L5 hybrid GNSS receiver and an L5 only GNSS receiver, and wherein the L5 only GNSS receiver directly acquires L5 GNSS signals without using L1 GNSS signals to aid in the acquisition of the L5 GNSS signals and wherein the L5 only GNSS receiver uses fast Fourier transforms (FFTs) to perform frequency domain correlation to directly acquire L5 GNSS signals, and wherein the L1/L5 hybrid receiver acquires and tracks both L1 and L5 GNSS signals.

21. In a GNSS receiver which receives a GNSS signal containing a primary pseudorandom number (PRN) code with frame length D and a secondary PRN code whose symbol durations are D or a multiple thereof, and wherein D is an integer and at least equal to one, a method of acquiring GNSS signals received by the GNSS receiver, the method comprising:

performing a first set of correlation operations utilizing a first carrier frequency hypothesis of the received signal, performing a second set of correlation operations utilizing a second carrier frequency hypothesis of the received signal, wherein the first and second frequency hypotheses differ from one another by a quantity in the range of 800 to 1200 Hz, and declaring a valid signal detection if each of the two sets of correlation operations result in output signal levels that exceed a specified detection threshold;

determining one or more pseudoranges in the GNSS receiver from the two sets of correlation operations result; and determining a position of the GNSS receiver from the determined one or more pseudoranges.

22. In a GNSS receiver which receives a GNSS signal containing a primary pseudorandom number (PRN) code with frame length D and a secondary PRN code whose symbol durations are D or a multiple thereof, and wherein D is an integer and at least equal to one, a method of acquiring GNSS signals received by the GNSS receiver, the method comprising:

performing a first set of correlation operations utilizing a first carrier frequency hypothesis of the received signal, performing a second set of correlation operations utilizing a second carrier frequency hypothesis of the received signal, wherein the first and second frequency hypotheses differ from one another by a quantity in the range of 800 to 1200 Hz, combining correlation operation results from the first and second sets of correlation operations, and declaring a valid signal detection if the combined results produce an output signal level that exceed a specified detection threshold;

determining one or more pseudoranges in the GNSS receiver from the combined results; and determining a position of the GNSS receiver from the determined one or more pseudoranges.

* * * * *